(12) United States Patent
Otaka

(10) Patent No.: US 11,307,573 B2
(45) Date of Patent: Apr. 19, 2022

(54) COMMUNICATION TERMINAL AND COMPUTER-READABLE STORAGE MEDIUM

(71) Applicant: HONDA MOTOR CO., LTD., Tokyo (JP)

(72) Inventor: Masaru Otaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 231 days.

(21) Appl. No.: 16/440,939

(22) Filed: Jun. 13, 2019

(65) Prior Publication Data

US 2019/0384278 A1 Dec. 19, 2019

(30) Foreign Application Priority Data

Jun. 15, 2018 (JP) .............................. JP2018-114467

(51) Int. Cl.
*G05D 1/00* (2006.01)
*B60R 25/24* (2013.01)
(Continued)

(52) U.S. Cl.
CPC ........... *G05D 1/0022* (2013.01); *B60R 25/24* (2013.01); *H04L 67/12* (2013.01)

(58) Field of Classification Search
None
See application file for complete search history.

(56) References Cited

U.S. PATENT DOCUMENTS 9,947,147 B1 * 4/2018 Kwak .................... G07C 5/085
2010/0305779 A1 12/2010 Hassan
(Continued)

FOREIGN PATENT DOCUMENTS

CN 105988422 A 10/2016
CN 106603470 A 4/2017
(Continued)

OTHER PUBLICATIONS

Notice of First Office Action for Patent Application No. 201910521626. X, issued by The National Intellectual Property Administration of the People's Republic of China dated Jun. 17, 2021.
(Continued)

*Primary Examiner* — Thomas S McCormack

(57) ABSTRACT

A communication terminal is provided, the communication terminal including: a candidate presenting unit that presents candidates of a remote driving apparatus user who is to remotely drive a vehicle; a request information sending unit that sends, to a communication terminal of the remote driving apparatus user selected from the candidates, request information indicating a request for remote driving of the vehicle; a response receiving unit that receives, from the communication terminal of the remote driving apparatus user, an acknowledgement of the request information; and a generation requesting unit that: sends first user identification information identifying a user of the vehicle, and second user identification information identifying the remote driving apparatus user to a server; and requests the server to generate key data for enabling a remote driving apparatus corresponding to the second user identification information to remotely drive the vehicle corresponding to the first user identification information.

19 Claims, 13 Drawing Sheets

(51) Int. Cl.
*H04L 29/08* (2006.01)
*H04L 67/12* (2022.01)

(56) References Cited

U.S. PATENT DOCUMENTS

| | | | |
|---|---|---|---|
| 2014/0207535 A1* | 7/2014 | Stefan | G07C 5/008 |
| | | | 705/7.42 |
| 2017/0186251 A1 | 6/2017 | Lee | |
| 2018/0074490 A1 | 3/2018 | Park | |
| 2019/0212732 A1 | 7/2019 | Takanashi | |

FOREIGN PATENT DOCUMENTS

| | | |
|---|---|---|
| CN | 106713264 A | 5/2017 |
| CN | 106921647 A | 7/2017 |
| JP | 2000311299 A | 11/2000 |
| JP | 2004206218 A | 7/2004 |
| JP | 2010117921 A | 5/2010 |
| WO | 2018037945 A1 | 3/2018 |

OTHER PUBLICATIONS

Office Action issued for counterpart Japanese Application No. 2018-114467, issued by the Japanese Patent Office dated Oct. 26, 2021 (drafted on Oct. 19, 2021).

\* cited by examiner

COMMUNICATION TERMINAL AND COMPUTER-READABLE STORAGE MEDIUM

The contents of the following Japanese patent application are incorporated herein by reference: NO. 2018-114467 filed on Jun. 15, 2018.

BACKGROUND

1. Technical Field

The present invention relates to a communication terminal, and a computer-readable storage medium.

2. Related Art

There are known techniques that allow electrically driven vehicles to remotely drive other vehicles, or allow remote driving apparatuses for remote driving to remotely drive vehicles (see Patent Literatures 1, 2, for example).

PRIOR ART LITERATURES

Patent Literatures

Patent Literature 1: Japanese Patent Application Publication No. 2000-311299
Patent Literature 2: Japanese Patent Application Publication No. 2004-206218

SUMMARY

It is desirable to provide a technique that enables improvement in security of vehicles when vehicle remote driving services are provided.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
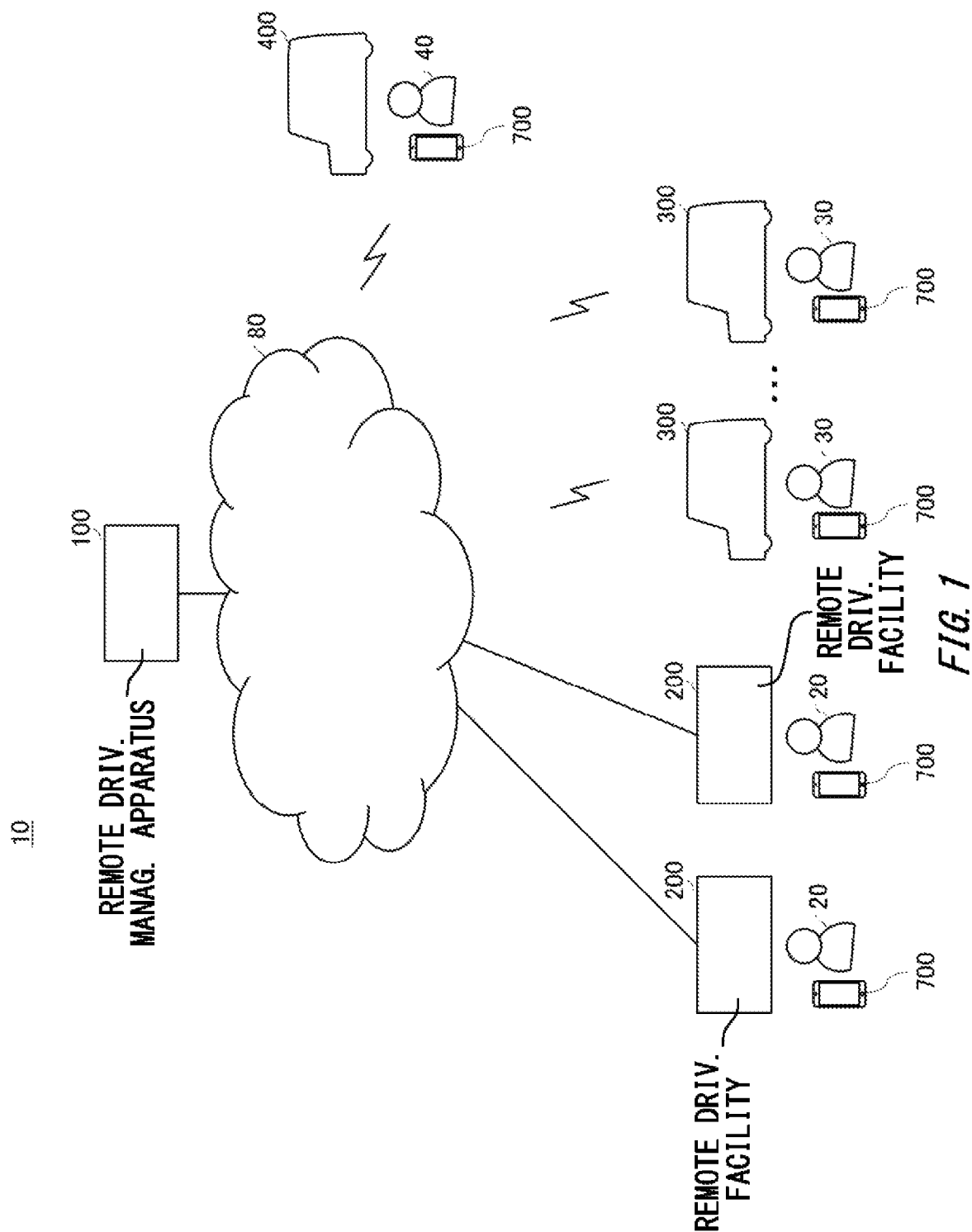
FIG. 1 schematically illustrates an exemplary remote driving system 10.

FIG. 1 schematically illustrates an exemplary remote driving system 10. The remote driving system 10 includes a remote driving managing apparatus 100, a plurality of remote driving facilities 200, a plurality of remote driving vehicles 300, and a vehicle 400. Although one vehicle 400 is illustrated as an example in FIG. 1, the number of vehicles 400 may be larger than one. The remote driving managing apparatus 100 may be an exemplary server.

Each remote driving facility 200 is a facility for remotely driving the vehicle 400 through a network 80. The network 80 may be any network, and may include at least any one of the internet, a mobile phone network such as a so-called 3G (3rd Generation) network, LTE (Long Term Evolution) network, 4G (4th Generation) network, or 5G (5th Generation) network, a public wireless LAN (Local Area Network), and a dedicated network, for example.

The remote driving facility 200 is a facility modelled on a driver's seat of an automobile, for example. The remote driving facility 200 has a manipulation unit to undergo manipulation by a user 20 of the remote driving facility 200, and a communication unit that sends, to the vehicle 400, control signals corresponding to manipulation of the manipulation unit. The remote driving facility 200 is an exemplary remote driving apparatus. The manipulation unit includes manipulation members necessary for driving a vehicle such as a wheel, an accelerator pedal, a brake pedal, a shift lever or a blinker lever. In addition, the manipulation unit may further include manipulation members for manipulating equipment such as a car navigation system, an air conditioner, audio equipment, sliding doors, a sunroof, or a seat heater. The communication unit receives images of the space around the vehicle 400 that are captured by image-capturing units provided to the vehicle 400. The remote driving facility 200 has a display unit that displays images of the space around the vehicle 400 that are received by the communication unit. By the user 20 manipulating the manipulation unit while viewing images displayed on the display unit, remote driving of the vehicle 400 is realized.

Each remote driving vehicle 300 is an automobile having a remote driving function of remotely driving the vehicle 400 through the network 80. The remote driving vehicle 300 may be capable of being driven through manipulation of a manipulation unit provided to the remote driving vehicle 300 (which driving is in some cases referred to as manual driving). In addition, the remote driving vehicle 300 may be capable of so-called self-driving.

The remote driving vehicle 300 has a manipulation unit that undergoes manipulation by a user 30 of the remote driving vehicle 300, and a communication unit that communicates with the vehicle 400 and the remote driving managing apparatus 100. The remote driving vehicle 300 is an exemplary remote driving apparatus. The manipulation unit includes manipulation members necessary for driving a vehicle such as a wheel, an accelerator pedal, a brake pedal, a shift lever or a blinker lever. In addition, the manipulation unit may further include manipulation members for manipulating equipment such as an air conditioner, audio equipment, a car navigation system, sliding doors, a sunroof, or a seat heater. The communication unit receives images of the space around the vehicle 400 that are captured by image-capturing units provided to the vehicle 400. The remote driving vehicle 300 has a display unit that displays images of the space around the vehicle 400 that are received by the communication unit. The remote driving vehicle 300 supports a manual driving mode, and a remotely driving mode, for example. In the manual driving mode, it travels according to manipulation of the manipulation unit, and in the remotely driving mode, it sends, to the vehicle 400, signals corresponding to manipulation of the manipulation unit. The user 30, for example, switches the mode of the remote driving vehicle 300 parked at a home parking space to the remotely driving mode to thereby be able to remotely drive the vehicle 400.

The vehicle 400 is an automobile that can be remotely driven by remote driving facilities 200, and remote driving vehicles 300. In addition to being able to be remotely driven, the vehicle 400 can be manually driven. In addition, the vehicle 400 may be capable of self-driving. The vehicle 400 may support a manual driving mode in which it travels according to control signals based on manual driving, a self-driving mode in which it travels according to control signals based on self-driving, and a remotely driven mode that in which it travels according to control signals based on remote driving.

In the manual driving mode, the vehicle 400 travels according to manipulation of the manipulation unit by a user 40. In the self-driving mode, the vehicle 400 uses apparatuses such as image-capturing units or radars provided to the vehicle 400, and positional information and map information to realize travelling, stopping, turning or the like of the vehicle 400 independent of steering, accelerator pedal manipulation, brake pedal manipulation, transmission manipulation or the like by a driver. In the remotely driven mode, the vehicle 400 realizes travelling, stopping, turning or the like according to control signals received from a remote driving facility 200 or a remote driving vehicle 300.

The remote driving managing apparatus 100 provides remote driving services to users 40 of a plurality of vehicles 400. The remote driving managing apparatus 100 may provide a remote driving service to a user 40 registered for such a service.

The remote driving managing apparatus 100 may store registration data of a plurality of users 40. The registration data may include: identification information identifying users 40; attribute information about the users 40; identification information identifying vehicles 400 used by the users 40; vehicle information about the vehicles 400; and identification information identifying communication terminals 700 of the users 40. The communication terminals 700 may be terminals carried by the users 40, and may be mobile phones such as smartphones, tablet terminals, PCs (Personal Computers) or the like, for example.

The attribute information about a user 40 may include basic information about the user 40. Exemplary basic information about a user 40 includes the name, address, date of birth, age, gender and the like of the user 40.

The attribute information about a user 40 may include a driving style of the user 40. The driving style of a user 40 indicates a driving tendency of the user 40. Exemplary driving styles include a driving speed tendency, a tendency among the numbers of times of acceleration/deceleration, a bypath usage tendency, a side-trip tendency and the like.

A driving speed tendency indicates a travelling speed tendency of a vehicle when the vehicle is driven by a user 40. For example, a driving speed tendency indicates whether a user 40 travels faster or slower than an average driving speed. In a specific example, a driving speed tendency is represented by a level such as fast, relatively fast, average, relatively slow, or slow. The steps of level are not limited to the five steps, but may include any number of steps.

A tendency among the numbers of times of acceleration/deceleration indicates a tendency among the numbers of times of acceleration/deceleration of a vehicle when the vehicle is driven by a user 40. Typically, it is often the case that the larger the number of times of acceleration/deceleration is, the rougher the manner of driving is determined to be. For example, a tendency among the numbers of times of acceleration/deceleration indicates whether a user 40's manner of driving exhibits a larger or smaller number of times of acceleration/deceleration than an average number of times of acceleration/deceleration. In a specific example, a tendency among the numbers of times of acceleration/deceleration is represented by a level such as many, relatively many, average, relatively few, or few. The steps of level are not limited to the five steps, but may include any number of steps.

A bypath usage tendency indicates a bypath usage tendency of a vehicle when the vehicle is driven by a user 40. For example, a bypath usage tendency indicates whether a user 40's manner of driving exhibits frequent or infrequent usage of bypaths compared to an average bypath usage tendency. In a specific example, a bypath usage tendency is represented by a level such as frequent, relatively frequent, average, relatively infrequent, or infrequent. The steps of level are not limited to the five steps, but may include any number of steps.

A side-trip tendency indicates a side-trip tendency of a vehicle when the vehicle is driven by a user 40. For example, a side-trip tendency indicates whether a user 40's manner of driving exhibits side trips many or few times compared to an average number of times of side trips until vehicles arrive at destinations. In a specific example, a side-trip tendency is represented by a level such as many, relatively many, average, relatively few, or few. The steps of level are not limited to the five steps, but may include any number of steps.

The attribute information about a user 40 may include a driving history of the user 40. The driving history of a user 40 includes various types of histories of a vehicle when the vehicle is is driven by the user 40. Exemplary driving histories of a user 40 include time periods during which the user 40 drove a vehicle, times at which the user 40 drove a vehicle, vehicle positions at individual times, vehicle speeds, contents of manipulation by the user 40, and the like. Exemplary contents of manipulation include wheel manipulation amounts, accelerator pedal stepping manipulation amounts, brake pedal stepping manipulation amounts, the numbers of times of acceleration/deceleration, and the like. The driving history of a user 40 may include a history of areas through which the user 40 has travelled by driving a vehicle; a history of time periods during which the user 40 has travelled by driving a vehicle; a history of destinations to which the user 40 has moved by driving a vehicle; and the like.

The vehicle information may include a vehicle name of a vehicle. A vehicle name is, for example, a name by which a vehicle is known. A vehicle name may be a so-called pet name. In addition, a vehicle name may be a so-called car name.

The vehicle information may include vehicle specifications. Specifications are symbols or terms used for distinguishing between vehicles which are known by identical names based on differences in interior decorations, exterior decorations, seats, transmissions or the like. Specifications may be information about so-called grades.

The vehicle information may include vehicle body shapes. Vehicle body shapes are symbols or terms used for expressing vehicle shapes, and for example are information described in the vehicle body shape fields of automobile inspection certificates. Exemplary vehicle body shapes include box-shapes, convertibles, station wagons, and the like. In addition, vehicle body shapes may be information about so-called body types. Exemplary body types include sedans, coupes, compact cars, open-top cars, minivans, box-shaped minivans, station wagons, SUVs (Sport Utility Vehicles), light automobiles, and the like.

The vehicle information may include vehicle models of vehicles. Vehicle models may be vehicle structures or classes of size. Exemplary vehicle models include standard-sized passenger cars, small-sized passenger cars, four-wheeled light passenger cars, small-sized trucks, four-wheeled light trucks, standard-sized automobiles, small-sized automobiles, light automobiles, large-sized special automobiles, small-sized special automobiles, and the like.

The vehicle information may include equipment information indicating vehicle equipment. Equipment information indicates optional equipment of vehicles, for example. Exemplary optional equipment includes power sliding doors, sunroofs, seat heaters, air cleaners, and the like.

The remote driving managing apparatus 100 may store registration data of remote driving apparatus users. The registration data may include: identification information identifying remote driving apparatus users; attribute information about remote driving apparatus users; identification information identifying remote driving apparatuses used by remote driving apparatus users; identification information identifying communication terminals 700 of remote driving apparatus users; and time periods during which remote driving apparatus users are available for remote driving. For example, the registration data may include: identification information identifying users 20; attribute information about users 20; identification information identifying remote driving facilities 200 used by users 20; identification information identifying communication terminals 700 of users 20; and time periods during which users 20 are available for remote driving. In addition, the registration data may include: identification information identifying users 30; attribute information about users 30; identification information identifying remote driving vehicles 300 used by users 30; vehicle information about remote driving vehicles 300; identification information identifying communication terminals 700 of users 30; and time periods during which users 30 are available for remote driving. Attribute information about remote driving apparatus users may be similar to attribute information about users 40. Vehicle information about remote driving vehicles 300 may be similar to vehicle information about vehicles 400.

Time periods during which users are available for remote driving are time periods during which remote driving apparatus users can remotely drive vehicles 400, and are registered by remote driving apparatus users, for example. Users 20 may register time periods during which they are available for remote driving in the remote driving managing apparatus 100 through remote driving facilities 200. In addition, users 30 may register time periods during which they are available for remote driving in the remote driving managing apparatus 100 through remote driving vehicles 300. In addition, users 20 and users 30 may use communication terminals 700 to register, through the network 80 and in the remote driving managing apparatus 100, time periods during which they are available for remote driving.

The remote driving managing apparatus 100 may manage registration data of remote driving apparatus users in a manner that allows users 40 to view the registration data. Users 40 use communication terminals 700, for example, to view the registration data of remote driving apparatus users. Users 40 can refer to the registration data, and select remote driving apparatus users who are to be requested to remotely drive vehicles 400.

A user 40 may send, from a communication terminal 700 of the user 40, request information indicating a request for remote driving of a vehicle 400, to a communication terminal 700 of a selected remote driving apparatus user. The request information may include identification information about the user 40, identification information about the communication terminal 700 of the user 40, and identification information about the vehicle 400. The request information may include section information indicating a travelling section through which the vehicle 400 is caused to travel by remotely driving. The request information may include positional information indicating the position of the vehicle 400. The request information may include time information indicating a time at which it is wished that the vehicle 400 be remotely driven. The request information may include vehicle information about the vehicle 400.

For example if wishing for remote driving from the home to a destination, the user 40 of the vehicle 400 sends, to the communication terminal 700 of the remote driving apparatus user, request information including: section information indicating a travelling section from the home to the destination, and time information determined based on a time of departure, and a length of time required to travel from the home to the destination. The length of time required to travel from the home to the destination may be set by the user 40, may be set by the communication terminal 700 of the user 40, or may be set by a navigation apparatus provided to the vehicle 400.

In addition, for example, if moving along the route to the destination by manual driving, and wishing for remote driving in a partial section, the user 40 of the vehicle 400 sends, to the communication terminal 700 of the remote driving apparatus user, request information including section information indicating the section, and time information indicating a time period during which the vehicle 400 travels through the section.

In addition, for example, if the vehicle 400 moves to the destination by self-driving, and there is a remote driving section through which the vehicle 400 travels by remote driving in the movement route, the vehicle 400 sends, to the communication terminal 700 of the remote driving apparatus user, request information including section information indicating the section, and time information indicating a time period during which the vehicle 400 travels through the section. The remote driving section is, for example, a section where self-driving is not possible, a section where self-driving is prohibited, a section where self-driving is not appropriate, or the like.

The remote driving apparatus user refers to the request information, determines whether or not to remotely drive the vehicle 400, and sends, from the communication terminal 700 of the remote driving apparatus user, an acknowledgement or a negative acknowledgement to the communication terminal 700 of the user 40.

If having received an acknowledgement, the communication terminal 700 of the user 40 requests the remote driving managing apparatus 100 to generate key data for enabling the remote driving apparatus of the remote driving apparatus user to remotely drive the vehicle 400. The communication terminal 700 of the user 40 may send, to the remote driving managing apparatus 100, identification information about the user 40, and identification information about the remote driving apparatus user, and request the remote driving managing apparatus 100 to generate key data.

The remote driving managing apparatus 100 identifies the vehicle 400 and the remote driving apparatus based on the received identification information about the user 40, and identification information about the remote driving apparatus user, and generates key data for enabling the remote driving apparatus to remotely drive the vehicle 400 based on the identification information about the vehicle 400. The remote driving managing apparatus 100 generates key data that is valid only once, for example. The remote driving managing apparatus 100 may generate key data by using any method.

The remote driving managing apparatus 100 sends the generated key data to the communication terminal 700 of the remote driving apparatus user. The remote driving apparatus user sends the key data from the communication terminal 700 to the remote driving apparatus. The remote driving apparatus uses the received key data to establish a connection with the vehicle 400. The remote driving apparatus sends, to the vehicle 400, control signals based on remote driving by the user through the established connection. Remote driving of a vehicle 400 is realized by such a flow of processes.

Figure 2:
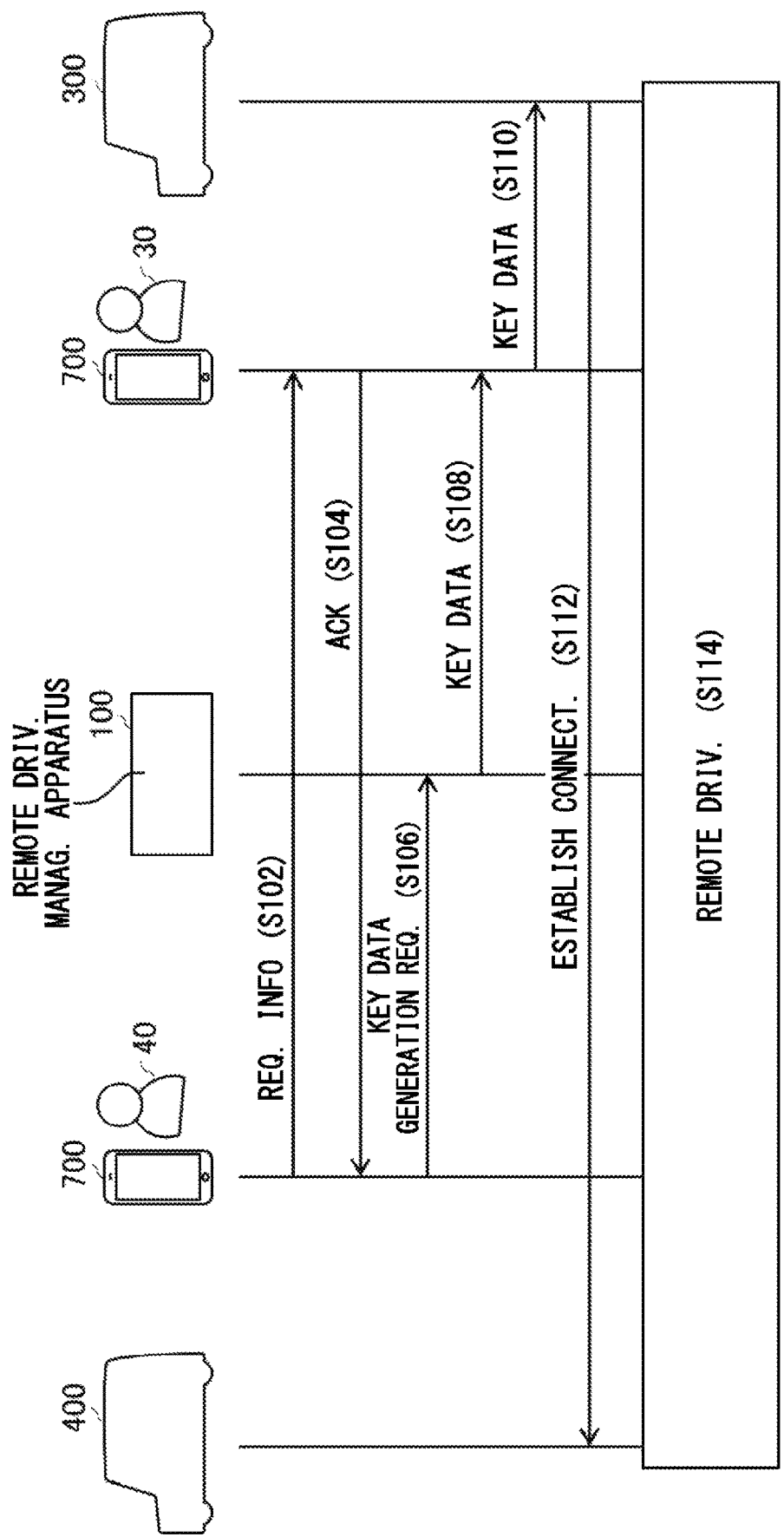
FIG. 2 schematically illustrates an exemplary flow of processes to be performed by the remote driving system 10.

FIG. 2 schematically illustrates an exemplary flow of processes to be performed by the remote driving system 10. The following explanation is about a flow of processes that starts when a communication terminal 700 of a user 40 sends request information to a communication terminal 700 of a selected remote driving apparatus user, and is performed until remote driving of a vehicle 400 is executed. In the example explained here, a user 30 is selected as a remote driving apparatus user.

At Step (steps are in some cases abbreviated to S's) 102, the communication terminal 700 of the user 40 sends, to the communication terminal 700 of the user 30, request information following an instruction by the user 40. At S104, the communication terminal 700 of the user 30 sends an acknowledgement to the communication terminal 700 of the user 40 following an instruction by the user 30.

At S106, the communication terminal 700 of the user 40 requests the remote driving managing apparatus 100 to generate key data. The remote driving managing apparatus 100 generates key data according to the request. At S108, the remote driving managing apparatus 100 sends the generated key data to the communication terminal 700 of the user 30.

At S110, the communication terminal 700 of the user 30 sends the key data to a remote driving vehicle 300. For example, the communication terminal 700 and the remote driving vehicle 300 are capable of near field communication such as NFC (Near Field Communication), communication using FeliCa (registered trademark), Bluetooth (registered trademark) communication or the like, and the communication terminal 700 sends the key data to the remote driving vehicle 300 through the near field communication.

At S112, the remote driving vehicle 300 uses the key data received at S110 to establish a connection with the vehicle 400. At S114, the remote driving vehicle 300 remotely drives the vehicle 400 through the connection established at S112. The vehicle 400 sends, to the remote driving vehicle 300, images of the space around the vehicle 400 captured by image-capturing units, and the remote driving vehicle 300 sends, to the vehicle 400, control signals based on remote driving.

Figure 3:
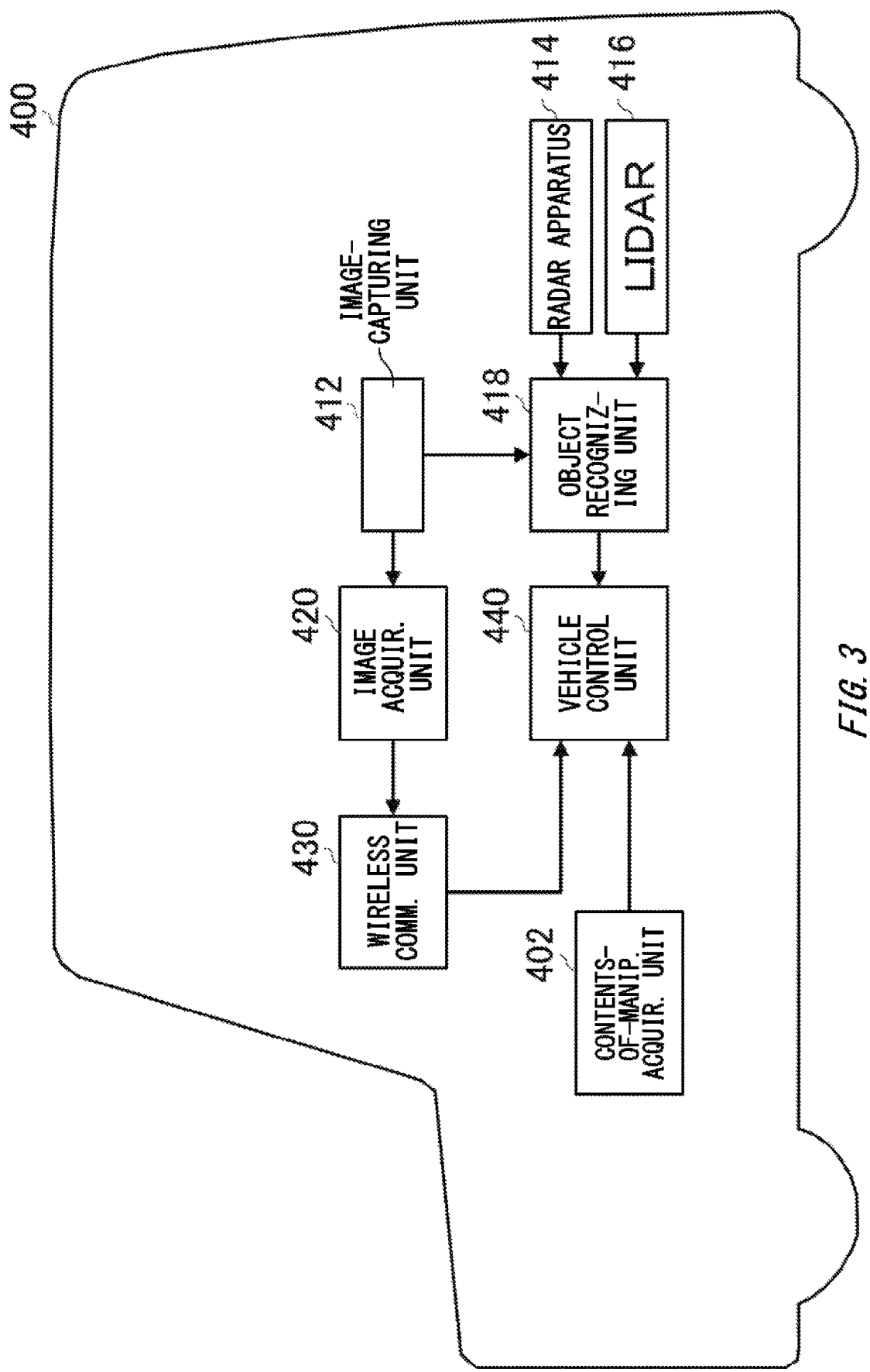
FIG. 3 schematically illustrates an exemplary functional configuration of a vehicle 400.

FIG. 3 schematically illustrates an exemplary functional configuration of a vehicle 400. The vehicle 400 includes a contents-of-manipulation acquiring unit 402, an image-capturing unit 412, a radar apparatus 414, a LIDAR (Light Detection and Ranging) 416, an object recognizing unit 418, an image acquiring unit 420, a wireless communication unit 430, and a vehicle control unit 440.

The contents-of-manipulation acquiring unit 402 acquires contents of manipulation of a manipulation unit provided to the vehicle 400. For example, the contents-of-manipulation acquiring unit 402 acquires a wheel steering angle, an accelerator pedal stepping manipulation amount, a brake pedal stepping manipulation amount, and the like.

The image-capturing unit 412 is at least one digital camera utilizing solid state image sensors such as CCDs (Charge Coupled Devices) or CMOSs (Complementary Metal Oxide Semiconductors), for example. The image-capturing unit 412 includes one or more image-capturing units that are attached to any locations of the vehicle 400. If images of the front space are to be captured, the image-capturing unit 412 is attached to an upper portion of the front wind shield, the rear surface of the room mirror, or the like. If a plurality of image-capturing units are attached as the image-capturing unit 412, the plurality of image-capturing units 412 may capture images of views in different directions. The image-capturing unit 412 captures images of the space around the vehicle 400 cyclically repetitively, for example. The image-capturing unit 412 may be a stereo camera.

The radar apparatus 414 emits radio waves such as millimeter waves to the space around the vehicle 400, and moreover senses radio waves (reflected waves) reflected off an object to sense at least an object position (distance, and azimuth). The radar apparatus 414 includes one or more radar apparatuses that are attached to any locations of the vehicle 400. The radar apparatus 414 may sense an object position and speed by using FM-CWs (Frequency Modulated Continuous Waves).

The LIDAR 416 irradiates the space around the vehicle 400 with light, and measures scattered light. The LIDAR 416 senses the distance to a target object based on a length of time that elapsed between light emission and light reception. The light with which the space is irradiated is pulsed laser light, for example. The LIDAR 416 includes one or more LIDARs that are attached to any locations of the vehicle 400.

The object recognizing unit 418 recognizes an object position, type, speed and the like based on results of sensing by some or all of the image-capturing unit 412, radar apparatus 414, and LIDAR 416. The object recognizing unit 418 outputs the recognition result to the vehicle control unit 440. In addition, the object recognizing unit 418 may output, to the vehicle control unit 440, the results of sensing by the image-capturing unit 412, radar apparatus 414, and LIDAR 416 without modifying them, as necessary.

The image acquiring unit 420 acquires images captured by the image-capturing unit 412. The wireless communication unit 430 wirelessly communicates with the remote driving managing apparatus 100, remote driving facilities 200, and remote driving vehicles 300 through the network 80. If the vehicle 400 is in the remotely driven mode, the wireless communication unit 430 sends, to a remote driving facility 200 or remote driving vehicle 300, images acquired by the image acquiring unit 420. In addition, if the vehicle 400 is in the remotely driven mode, the wireless communication unit 430 receives remote driving signals from the remote driving facility 200 or remote driving vehicle 300, and outputs them to the vehicle control unit 440.

The vehicle control unit 440 controls the vehicle 400. The vehicle control unit 440 may have a positional information acquiring unit that acquires information indicating the position of the vehicle 400. The positional information acquiring unit receives positional information about the vehicle 400 from a navigation apparatus provided to the vehicle 400, for example. The navigation apparatus of the vehicle 400 has a GNSS (Global Navigation Satellite System) receiver, for example, and the GNSS receiver identifies the position of the vehicle 400 based on signals received from a GNSS satellite. Note that the positional information acquiring unit may have the GNSS receiver.

The vehicle control unit 440 may acquire destination information indicating a destination of the vehicle 400, and route information indicating a movement route to the destination. The vehicle control unit 440 acquires the destination information and route information from the navigation apparatus provided to the vehicle 400, for example.

The vehicle control unit 440 acquires first map information including map information about at least the movement route indicated by the route information. The vehicle control unit 440 receives the first map information from the navigation apparatus of the vehicle 400, for example. In addition, the vehicle control unit 440 may receive, through the network 80, the first map information from a map managing server that manages map information about each location. The first map information is information representing road shapes by links indicating roads, and nodes connected by the links, for example. The first map information may include curvatures of roads, POI (Point Of Interest) information, or the like. The first map information may be updated at any time.

The vehicle control unit 440 may further acquire second map information including map information about at least the movement route indicated by the route information. The vehicle control unit 440 may receive the second map information from the navigation apparatus of the vehicle 400, or may receive the second map information through the network 80, similar to the first map information. The second map information is map information more precise than the first map information. The second map information includes information about the middles of lanes, information about lane boundaries, and the like, for example. In addition, the second map information may include road information, traffic restriction information, and the like. The second map information may be updated at any time.

If the vehicle 400 is in the self-driving mode, the vehicle control unit 440 may control travelling of the vehicle 400 by using positions acquired by the positional information acquiring unit, information received from the object recognizing unit 418, and the first map information. The vehicle control unit 440 may further use the second map information to control travelling of the vehicle 400. If the vehicle 400 is in the manual driving mode, the vehicle control unit 440 may control travelling of the vehicle 400 according to contents of manipulation acquired by the contents-of-manipulation acquiring unit 402.

If the vehicle 400 is in the remotely driven mode, the vehicle control unit 440 controls travelling of the vehicle 400 according to signals that the wireless communication unit 430 receives from a remote driving facility 200 or remote driving vehicle 300.

Figure 4:
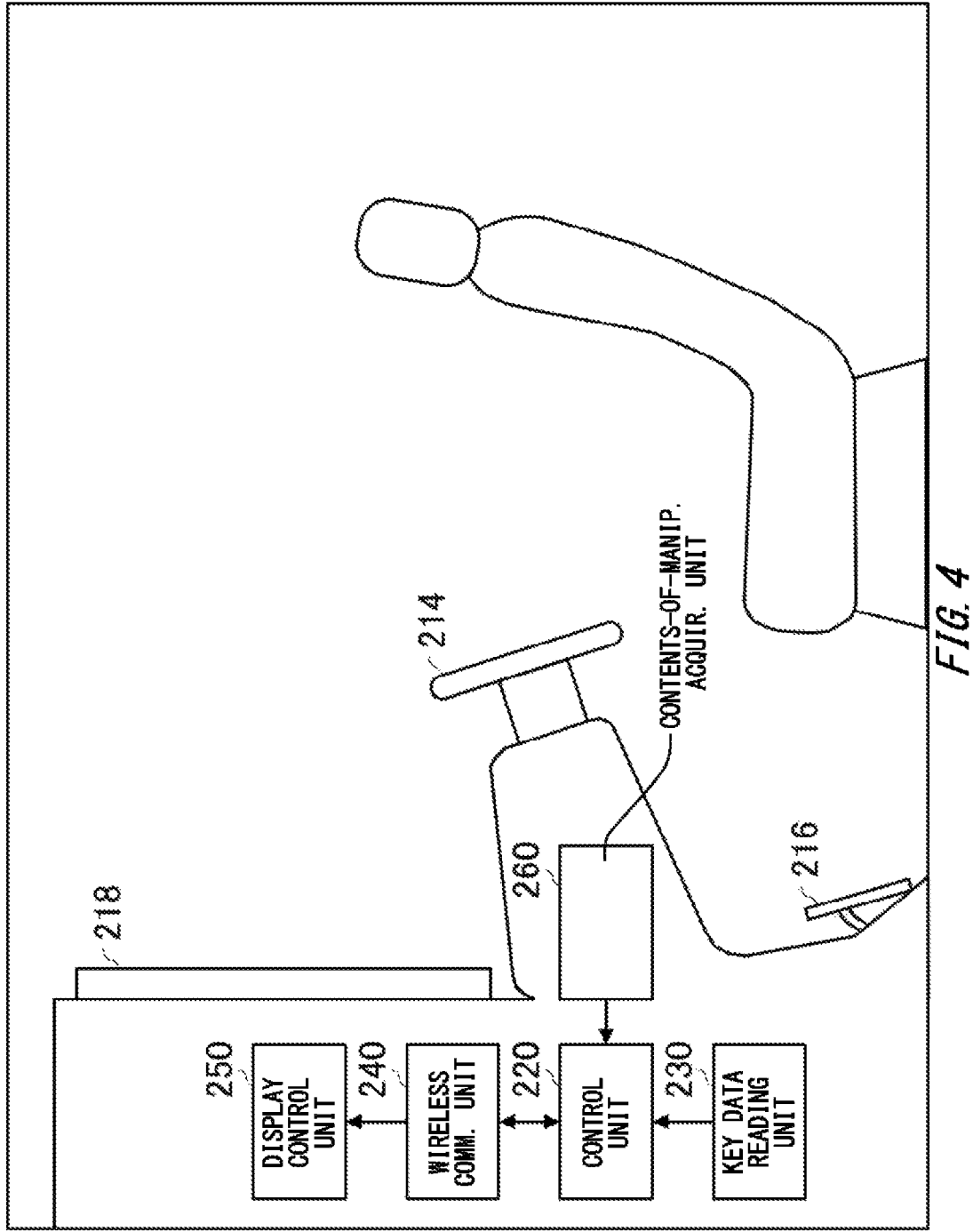
FIG. 4 schematically illustrates an exemplary remote driving facility 200.

FIG. 4 schematically illustrates an exemplary remote driving facility 200. Illustration of manipulation members other than a wheel 214 and a pedal 216 is omitted from FIG. 4.

The remote driving facility 200 includes a display unit 218, a control unit 220, a key data reading unit 230, a wireless communication unit 240, a display control unit 250, and a contents-of-manipulation acquiring unit 260. The control unit 220 performs various types of control.

The key data reading unit 230 reads out key data from a communication terminal 700. The key data reading unit 230 may read out the key data from the communication terminal 700 through near field communication.

The wireless communication unit 240 communicates with the remote driving managing apparatus 100. In addition, the wireless communication unit 240 communicates with a vehicle 400. The wireless communication unit 240 may communicates with the vehicle 400 through the remote driving managing apparatus 100. In addition, the wireless communication unit 240 may communicate with the vehicle 400 through the network 80, bypassing the remote driving managing apparatus 100.

The contents-of-manipulation acquiring unit 260 acquires contents of manipulation of a manipulation member of the remote driving facility 200. The contents-of-manipulation acquiring unit 260 acquires a steering angle of the steering, a stepping manipulation amount of the pedal 216, or the like, for example.

If the key data reading unit 230 reads out the key data, the control unit 220 controls the wireless communication unit 240, and establishes a connection with the vehicle 400 by using the key data. After a connection with the vehicle 400 is established, the control unit 220 makes the wireless communication unit 240 send, to the vehicle 400, control signals corresponding to contents of manipulation acquired by the contents-of-manipulation acquiring unit 260.

The wireless communication unit 240 receives images sent by a wireless communication unit 430 of the vehicle 400. The display control unit 250 makes the display unit 218 display images that the wireless communication unit 240 received from the vehicle 400. Note that the remote driving facility 200 may include a projector and a screen instead of the display unit 218, and in this case the display control unit 250 may use the projector to project images received by the wireless communication unit 240 onto the screen.

Figure 5:
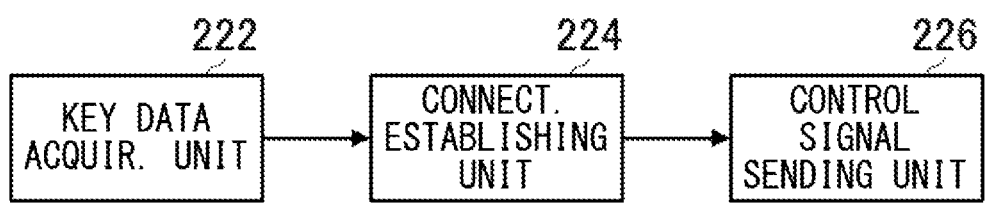
FIG. 5 schematically illustrates an exemplary functional configuration realized by a control unit 220.

FIG. 5 schematically illustrates an exemplary functional configuration realized by the control unit 220. The control unit 220 may realize a key data acquiring unit 222, a connection establishing unit 224, and a control signal sending unit 226.

The key data acquiring unit 222 acquires key data. The key data acquiring unit 222 receives the key data from the key data reading unit 230. The connection establishing unit 224 establishes a connection with the vehicle 400 by using the key data acquired by the key data acquiring unit 222. The control signal sending unit 226 controls the wireless communication unit 240 to sends, to the vehicle 400 through the connection established by the connection establishing unit 224, control signals corresponding to the contents of manipulation acquired by the contents-of-manipulation acquiring unit 260.

Figure 6:
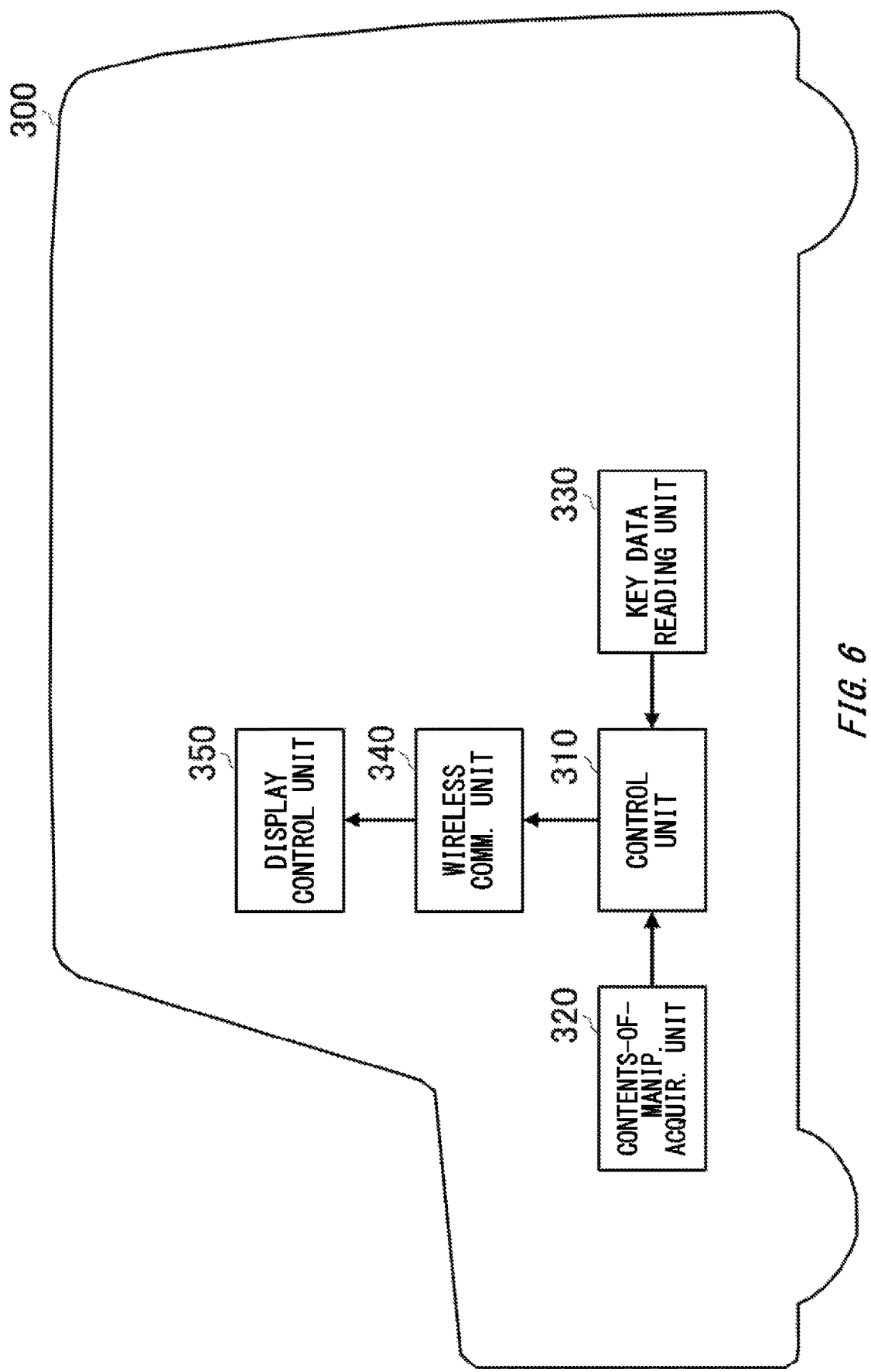
FIG. 6 schematically illustrates an exemplary remote driving vehicle 300.

FIG. 6 schematically illustrates an exemplary functional configuration of a remote driving vehicle 300. The remote driving vehicle 300 includes a control unit 310, a contents-of-manipulation acquiring unit 320, a key data reading unit 330, a wireless communication unit 340, and a display control unit 350. The control unit 310 performs various types of control.

The contents-of-manipulation acquiring unit 320 acquires contents of manipulation of a manipulation unit provided to the remote driving vehicle 300, and outputs them to the control unit 310. For example, the contents-of-manipulation acquiring unit 320 acquires a steering angle of the steering, an accelerator pedal stepping manipulation amount, a brake pedal stepping manipulation amount, and the like. If the remote driving vehicle 300 in the manual driving mode, the control unit 310 controls the remote driving vehicle 300 according to the contents of manipulation.

The key data reading unit 330 reads out key data from a communication terminal 700. The key data reading unit 330 may read out the key data from the communication terminal 700 through near field communication.

The wireless communication unit 340 communicates with the remote driving managing apparatus 100. In addition, the wireless communication unit 340 communicates with a vehicle 400. The wireless communication unit 340 may communicate with the vehicle 400 through the remote driving managing apparatus 100. In addition, the wireless communication unit 340 may communicate with the vehicle 400 through the network 80, bypassing the remote driving managing apparatus 100.

If the remote driving vehicle 300 is in the remotely driving mode, and the key data reading unit 330 reads out the key data, the control unit 310 controls the wireless communication unit 340, and establishes a connection with the vehicle 400 by using the key data. After a connection with the vehicle 400 is established, the control unit 310 outputs, to the wireless communication unit 340, control signals corresponding to the contents of manipulation acquired by the contents-of-manipulation acquiring unit 320. The wireless communication unit 340 sends the control signals to the vehicle 400 through the network 80.

The wireless communication unit 340 receives images sent by a wireless communication unit 430 of the vehicle 400, and outputs them to the display control unit 350. The display control unit 350 causes a display unit provided to the remote driving vehicle 300 to display the received images.

If the remote driving vehicle 300 is capable of self-driving, it may further include configurations similar to the image-capturing unit 412, radar apparatus 414, LIDAR 416, and object recognizing unit 418.

Figure 7:
FIG. 7 schematically illustrates an exemplary functional configuration realized by a control unit 310.

FIG. 7 schematically illustrates an exemplary functional configuration realized by the control unit 310. The control unit 310 may realize a key data acquiring unit 312, a connection establishing unit 314, and a control signal sending unit 316.

The key data acquiring unit 312 acquires key data. The key data acquiring unit 312 receives the key data from the key data reading unit 330. The connection establishing unit 314 establishes a connection with the vehicle 400 by using the key data acquired by the key data acquiring unit 312. The control signal sending unit 316 controls the wireless communication unit 340 to sends, to the vehicle 400 through the connection established by the connection establishing unit 314, control signals corresponding to the contents of manipulation acquired by the contents-of-manipulation acquiring unit 320.

Figure 8:
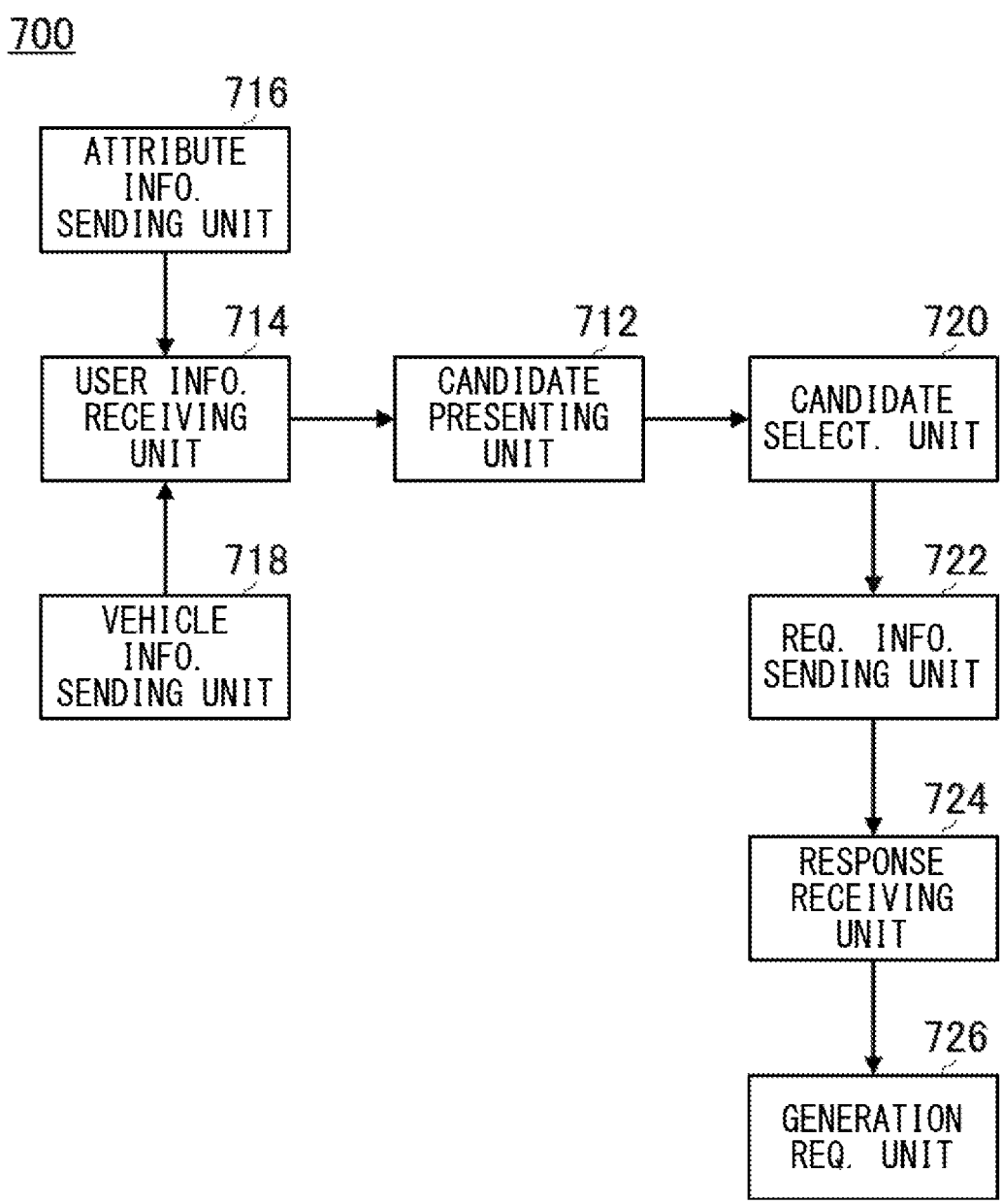
FIG. 8 schematically illustrates an exemplary functional configuration of a communication terminal 700.

FIG. 8 schematically illustrates an exemplary functional configuration of a communication terminal 700. The communication terminal 700 includes a candidate presenting unit 712, a user information receiving unit 714, an attribute information sending unit 716, a vehicle information sending unit 718, a candidate selecting unit 720, a request information sending unit 722, a response receiving unit 724, and a generation requesting unit 726. Note that the communication terminal 700 is not necessarily required to include all these configurations.

The candidate presenting unit 712 presents candidates of a remote driving apparatus user who is to remotely drive a vehicle 400. The candidate presenting unit 712 causes a display unit provided to the vehicle 400 to display-output candidates, for example. In addition, the candidate presenting unit 712 may cause an audio output unit provided to the vehicle 400 to audio-output candidates. The candidate presenting unit 712 may receive registration data of remote driving apparatus users managed by the remote driving managing apparatus 100, and use the registration data to present candidates of the remote driving apparatus user.

The user information receiving unit 714 receives information about remote driving apparatus users from the remote driving managing apparatus 100. The user information receiving unit 714 receives the information about remote driving apparatus users sent by the remote driving managing apparatus 100, according to a request from the communication terminal 700, for example. The candidate presenting unit 712 may present candidates of the remote driving apparatus user by using the information about remote driving apparatus users received by the user information receiving unit 714.

The attribute information sending unit 716 sends attribute information about a user 40 to the remote driving managing apparatus 100. The attribute information sending unit 716 may send, to the remote driving managing apparatus 100, the attribute information about the user 40 following an instruction by the user 40. The attribute information sending unit 716 sends, to the remote driving managing apparatus 100, a driving style of the user 40, for example. In addition, the attribute information sending unit 716 sends, to the remote driving managing apparatus 100, a driving history of the user 40, for example. The user information receiving unit 714 may receive, from the remote driving managing apparatus 100, information about a remote driving apparatus user having attribute information corresponding to the attribute information that the attribute information sending unit 716 sent to the remote driving managing apparatus 100.

The vehicle information sending unit 718 sends vehicle information about the vehicle 400 to the remote driving managing apparatus 100. The vehicle information sending unit 718 may send, to the remote driving managing apparatus 100, the vehicle information about the vehicle 400 following an instruction by the user 40. The vehicle information sending unit 718 sends the vehicle name of the vehicle 400 to the remote driving managing apparatus 100, for example. The user information receiving unit 714 may receive, from the remote driving managing apparatus 100, information about a remote driving apparatus user corresponding to the vehicle information that the vehicle information sending unit 718 sent to the remote driving managing apparatus 100.

The candidate selecting unit 720 selects a remote driving apparatus user who is to be requested to remotely drive the vehicle 400 from candidates presented by the candidate presenting unit 712. The candidate selecting unit 720 may select a remote driving apparatus user by receiving an indication of selection made by the user 40. The candidate selecting unit 720 may receive an indication of selection made by the user 40 through touch input to a display unit of the vehicle 400, audio input to an audio input unit of the vehicle 400, or the like, for example.

The request information sending unit 722 sends request information indicating a request for remote driving of the vehicle 400 to a communication terminal 700 of the remote driving apparatus user selected by the candidate selecting unit 720. The request information sending unit 722 may send the request information to the communication terminal 700 following an instruction by the user 40.

The response receiving unit 724 receives a response to the request information sent by the request information sending unit 722. The response receiving unit 724 receives an acknowledgement or a negative acknowledgement.

Upon reception of an acknowledgement by the response receiving unit 724, the generation requesting unit 726 requests the remote driving managing apparatus 100 to generate key data. The generation requesting unit 726 may send, to the remote driving managing apparatus 100, identification information about the user 40, and identification information about the remote driving apparatus user selected by the candidate selecting unit 720, and request the remote driving managing apparatus 100 to generate key data.

Figure 9:
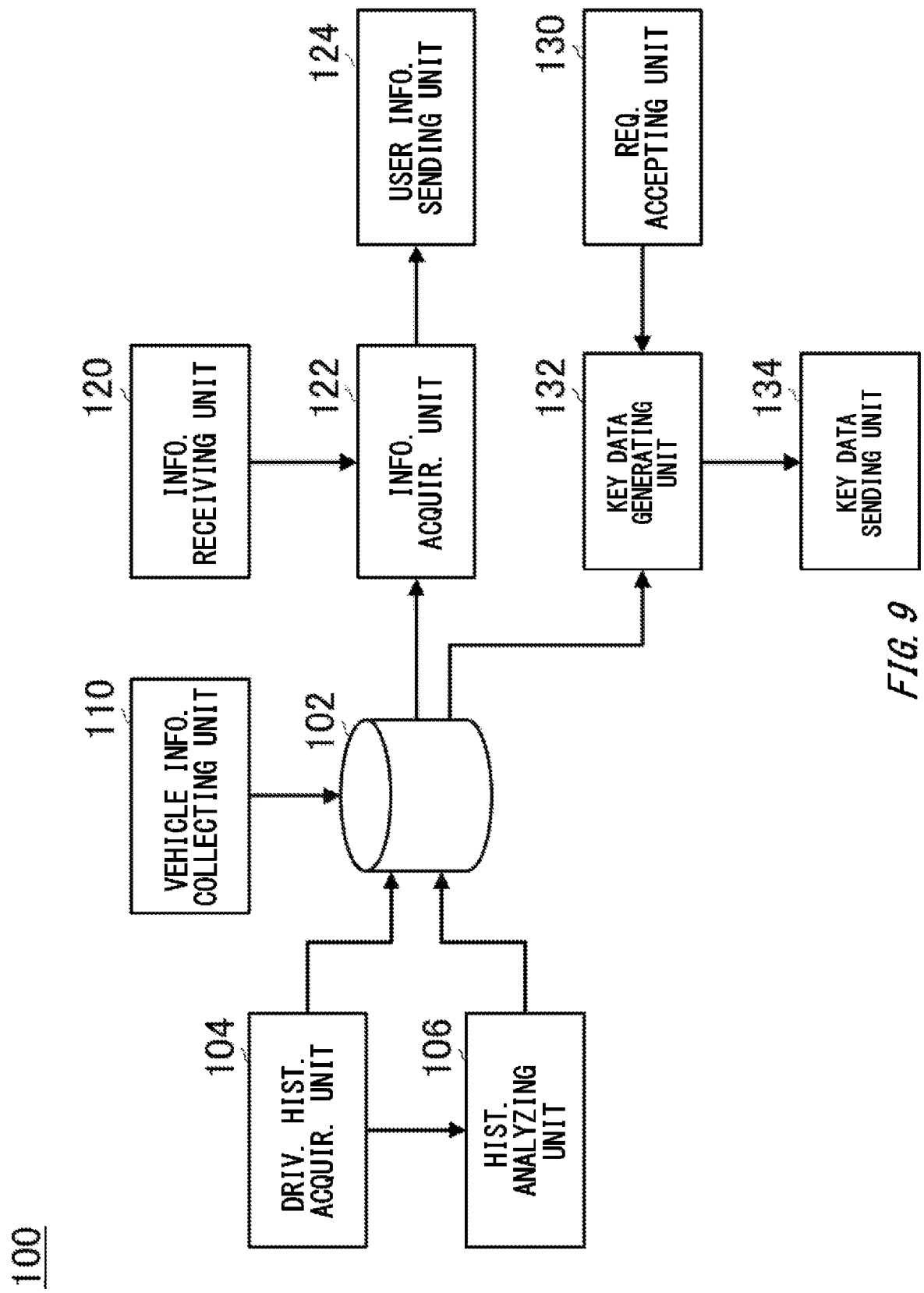
FIG. 9 schematically illustrates an exemplary functional configuration of a remote driving managing apparatus 100.

FIG. 9 schematically illustrates an exemplary functional configuration of the remote driving managing apparatus 100. The remote driving managing apparatus 100 includes a storage unit 102, a driving history acquiring unit 104, a history analyzing unit 106, a vehicle information collecting unit 110, an information receiving unit 120, an information acquiring unit 122, a user information sending unit 124, a request accepting unit 130, a key data generating unit 132, and a key data sending unit 134. Note that the remote driving managing apparatus 100 is not necessarily required to include all these configurations.

The storage unit 102 stores various types of information. The storage unit 102 stores registration data of users 40. In addition, the storage unit 102 stores registration data of users 20. In addition, the storage unit 102 stores registration data of users 30.

The driving history acquiring unit 104 acquires driving histories. The driving history acquiring unit 104 stores the acquired driving histories in the storage unit 102.

The driving history acquiring unit 104 acquires driving histories of remote driving apparatus users. The driving history acquiring unit 104 may periodically acquire driving histories of remote driving apparatus users registered for remote driving services provided by the remote driving managing apparatus 100.

The driving history acquiring unit 104 receives, from a remote driving vehicle 300, a manual driving history of a user 30 recorded by the remote driving vehicle 300 while the user 30 is manually driving the remote driving vehicle 300, for example. In addition, the driving history acquiring unit 104 receives a remote driving history of a user 30 recorded by a remote driving vehicle 300, the remote driving managing apparatus 100 or a vehicle 400 while the user 30 is remotely driving the vehicle 400 by using the remote driving vehicle 300, for example. If a communication terminal 700 of a user 30 is managing the driving history of the user 30, the driving history acquiring unit 104 may receive a driving history of the user 30 from the communication terminal 700. In addition, the driving history acquiring unit 104 may receive a driving history of of a user 30 from a managing server that manages the driving history of the user 30.

In addition, the driving history acquiring unit 104 receives a remote driving history of a user 20 recorded by a remote driving facility 200, the remote driving managing apparatus 100 or a vehicle 400 while the user 20 is remotely driving the vehicle 400 by using the remote driving facility 200, for example. If a communication terminal 700 of a user 20 is managing the driving history of the user 20, the driving history acquiring unit 104 may receive a driving history of the user 20 from the communication terminal 700. In addition, the driving history acquiring unit 104 may receive a driving history of of a user 20 from a managing server that manages the driving history of the user 20.

The history analyzing unit 106 analyzes a driving history acquired by the driving history acquiring unit 104. The history analyzing unit 106 analyzes a driving history of a remote driving apparatus user, and identifies the driving style of the remote driving apparatus user, for example.

The vehicle information collecting unit 110 collects vehicle information. The vehicle information collecting unit 110 may receive vehicle information about a remote driving vehicle 300 from the remote driving vehicle 300. In addition, the vehicle information collecting unit 110 may receive vehicle information about a remote driving vehicle 300 from a communication terminal 700 of a user 30. Note that the vehicle information collecting unit 110 may receive, through the network 80, vehicle information about a remote driving vehicle 300 from a vehicle information managing server that manages vehicle information about a plurality of vehicles.

The storage unit 102 may add vehicle information collected by the vehicle information collecting unit 110 to a corresponding piece of registration data. The storage unit 102 may store vehicle name correspondence information. The vehicle name correspondence information is information including, in association with each other, vehicle names of vehicles having identical or similar structures. As the vehicle name correspondence information, for example, vehicle names of vehicles that are manufactured by the same OEMs (Original Equipment Manufacturers) may be registered in association with each other. In addition, as the vehicle name correspondence information, for example, vehicle names of vehicles determined as having similar structures may be registered in association with each other. The determination is performed by a manage of the remote driving managing apparatus 100, or the like, for example.

The information receiving unit 120 receives various types of information from communication terminals 700 of users 40. The storage unit 102 receives attribute information about a user 40 sent by an attribute information sending unit 716, for example. In addition, for example, the information receiving unit 120 receives vehicle information about a vehicle 400 sent by a vehicle information sending unit 718.

Based on information received by the information receiving unit 120, the information acquiring unit 122 acquires information about remote driving apparatus users from the storage unit 102. The user information sending unit 124 sends, to a communication terminal 700 of a user 40, the information about the remote driving apparatus users acquired by the information acquiring unit 122.

The information acquiring unit 122 identifies a remote driving apparatus user having attribute information corresponding to attribute information about a user 40, and acquires information about the user, for example. In a specific example, the information acquiring unit 122 identifies a remote driving apparatus user having matching basic information about attribute information received by the information receiving unit 120.

The information acquiring unit 122 identifies a remote driving apparatus user at an age matching the age of the user 40, for example. In addition, the information acquiring unit 122 identifies a remote driving apparatus user of a gender matching the gender of the user 40, for example. If they are at the same age and of the same gender, it is relatively likely that they resemble also in terms of the characteristics of driving; therefore, information about a remote driving apparatus user having driving characteristics similar to the driving characteristics of the user 40 can be acquired.

In addition, the information acquiring unit 122 identifies a remote driving apparatus user whose driving style matches the driving style of the user 40, for example. In addition, the information acquiring unit 122 identifies a remote driving apparatus user whose driving style is similar to the driving style of the user 40, for example.

The information acquiring unit 122 identifies a remote driving apparatus user having a driving speed tendency matching the driving speed tendency of the user 40, for example. In addition, the information acquiring unit 122 identifies a remote driving apparatus user having a driving speed tendency similar to the driving speed tendency of the user 40, for example. Being similar in terms of driving speed tendency may mean that they belong to driving speed levels that are next to each other (e.g., "relatively fast" and "fast"), for example. Thereby, a remote driving apparatus user highly likely to drive in a manner that gives less uneasiness in terms of driving speed to the user 40 can be identified.

In addition, the information acquiring unit 122 identifies a remote driving apparatus user having a tendency among the numbers of times of acceleration/deceleration matching the tendency among the numbers of times of acceleration/deceleration of the user 40, for example. In addition, the information acquiring unit 122 identifies a remote driving apparatus user having a tendency among the numbers of times of acceleration/deceleration similar to the tendency among the numbers of times of acceleration/deceleration of the user 40, for example. Being similar in terms of tendency among the numbers of times of acceleration/deceleration may mean that they belong to levels of the number of times of acceleration/deceleration that are next to each other (e.g., "relatively many" and "many"), for example. Thereby, a remote driving apparatus user that matches the user 40 in terms of roughness of driving or the degrees of safe driving can be identified.

In addition, the information acquiring unit 122 identifies a remote driving apparatus user having a bypath usage tendency matching the bypath usage tendency of the user 40, for example. In addition, the information acquiring unit 122 identifies a remote driving apparatus user having a bypath usage tendency similar to the bypath usage tendency of the user 40, for example. Being similar in terms of bypath usage tendency may mean that they belong to bypath usage tendency levels that are next to each other (e.g., "relatively many" and "many"), for example.

In addition, the information acquiring unit 122 identifies a remote driving apparatus user having a side-trip tendency matching the side-trip tendency of the user 40, for example. In addition, the information acquiring unit 122 identifies a remote driving apparatus user having a side-trip tendency similar to the side-trip tendency of the user 40, for example. Being similar in terms of side-trip tendency may mean that they belong to levels of the number of times of side trip that are next to each other (e.g., "relatively many" and "many"), for example. Thereby, a remote driving apparatus user who is used to side trips can be identified in the case that the user 40 is a person who makes side trips often, and wishes to make side trips also at the time of remote driving.

The information acquiring unit 122 identifies a remote driving apparatus user having a driving history matching the driving history of the user 40, for example. In addition, the information acquiring unit 122 identifies a remote driving apparatus user having a driving history similar to the driving history of the user 40, for example.

The information acquiring unit 122 identifies a remote driving apparatus user having a travelling area tendency matching the travelling area tendency of the user 40, for example. Thereby, for example, a remote driving apparatus user who knows well about the geography of an area through which the vehicle 400 is to be remotely driven can be identified. In addition, the information acquiring unit 122 identifies a remote driving apparatus user having a travelling time tendency matching the travelling time tendency of the user 40, for example. In addition, the information acquiring unit 122 identifies a remote driving apparatus user having a destination tendency matching the destination tendency of the user 40, for example. Thereby, for example if the user 40 is a person who visits ramen restaurants often, a remote driving apparatus user who moves to ramen restaurants often by a vehicle, and knows well about ramen restaurants that can be visited by vehicles can be identified.

The information acquiring unit 122 may combine multiples ones of the above-mentioned conditions to identify a remote driving apparatus user. Thereby, a remote driving apparatus user suited for the user 40 can be identified from multiple points of view.

The information acquiring unit 122 identifies a user 30 of a remote driving vehicle 300 corresponding to vehicle information about a vehicle 400, and acquires information about the user 30, for example. The information acquiring unit 122 compares the vehicle information about the vehicle 400 with the vehicle information about a plurality of remote driving vehicles 300, and, based on a result of the comparison, identifies a user 30 to remotely drive the vehicle 400.

The information acquiring unit 122 may identify a user 30 based on the vehicle name of the vehicle 400, and the vehicle names of a plurality of remote driving vehicles 300. For example, the information acquiring unit 122 identifies a user 30 of a remote driving vehicle 300 having a vehicle name matching the vehicle name of the vehicle 400. In addition, for example, the information acquiring unit 122 identifies a user 30 of a remote driving vehicle 300 having a vehicle name part of which matches the vehicle name of the vehicle 400. In addition, for example, the information acquiring unit 122 identifies a user 30 of a remote driving vehicle 300 having a vehicle name with the degree of match with the vehicle name of the vehicle 400 higher than a predetermined threshold. The degree of vehicle name match may be calculated by any calculation method. For example, the degree of vehicle name match may be a degree of match between vehicle name character strings. The threshold may be determined arbitrarily, and may be changeable. In addition, for example, the information acquiring unit 122 may refer to vehicle name correspondence information stored in the storage unit 102, and identify a user 30 of a remote driving vehicle 300 having a vehicle name corresponding to the vehicle name of the vehicle 400.

The information acquiring unit 122 may identify a user 30 based on the vehicle name and specifications of the vehicle 400, and the vehicle names and specifications of a plurality of remote driving vehicles 300. For example, the information acquiring unit 122 identifies a user 30 of a remote driving vehicle 300 having matching specifications from remote driving vehicles 300 selected based on vehicle names in the above-mentioned manner. In addition, for example, the information acquiring unit 122 calculates the degree of match between the specifications of the vehicle 400 and the specifications of each of the remote driving vehicles 300 selected based on vehicle names, and, based on the degrees of match, identifies a user 30 of a remote driving vehicle 300. The degree of match between specifications may be calculated by any calculation method. For example, a similarity between specifications may be the degree of match between character strings of specifications. The information acquiring unit 122 identifies a user 30 of a remote driving vehicle 300 having the highest degree of match, for example.

The information acquiring unit 122 may identify a user 30 based on the equipment information about the vehicle 400, and the equipment information about a plurality of remote driving vehicles 300. For example, the information acquiring unit 122 identifies a user 30 of a remote driving vehicle 300 having equipment information matching the equipment information of the vehicle 400. In addition, for example, the information acquiring unit 122 calculates the degree of match between the equipment information about the vehicle 400 and the equipment information about a plurality of remote driving vehicles 300, and, based on the degrees of match, identifies a user 30 of a remote driving vehicle 300. The degree of equipment information match may be calculated by any calculation method. For example, the degree of equipment information match may be the proportion of the number of pieces of equipment of the vehicle 400 matching the equipment of a remote driving vehicle 300 to the total number of pieces of equipment of the vehicle 400. For example, if the total number of pieces of equipment of the vehicle 400 is 10, and eight pieces of the equipment of the vehicle 400 match the equipment of the remote driving vehicle 300, the degree of match is 80%.

The information acquiring unit 122 may identify a user 30 based on the vehicle name and equipment information of the vehicle 400, and the vehicle names and equipment information of a plurality of remote driving vehicles 300. In addition, the information acquiring unit 122 may identify a user 30 based on the vehicle name, specifications and equipment information of the vehicle 400, and the vehicle names, specifications and equipment information of a plurality of remote driving vehicles 300.

From a communication terminal 700 of a user 40, the request accepting unit 130 receives a request for generation of key data. The request accepting unit 130 may receive, from the communication terminal 700, request information indicating a request for generation of key data. The request information may include identification information about the user 40, and identification information about a remote driving apparatus user.

Upon reception of the request by the request accepting unit 130, the key data generating unit 132 generates key data. The key data generating unit 132 may read out, from the storage unit 102, identification information about a vehicle 400 which is a remote driving target, and identification information about a remote driving apparatus by using the identification information about the user 40, and the identification information about the remote driving apparatus user.

The key data generating unit 132 may generate key data for enabling the remote driving apparatus to remotely drive the vehicle 400 which is a remote driving target based on identification information about the vehicle 400. The key data generating unit 132 generates key data that is valid only once, for example. The key data sending unit 134 sends, to the communication terminal 700 of the remote driving apparatus user, the key data generated by the key data generating unit 132.

Although, in the above-mentioned embodiment explained, the remote driving managing apparatus 100 generates key data, this is not the sole example, and a communication terminal 700 of a user 40 may generate key data.

Figure 10:
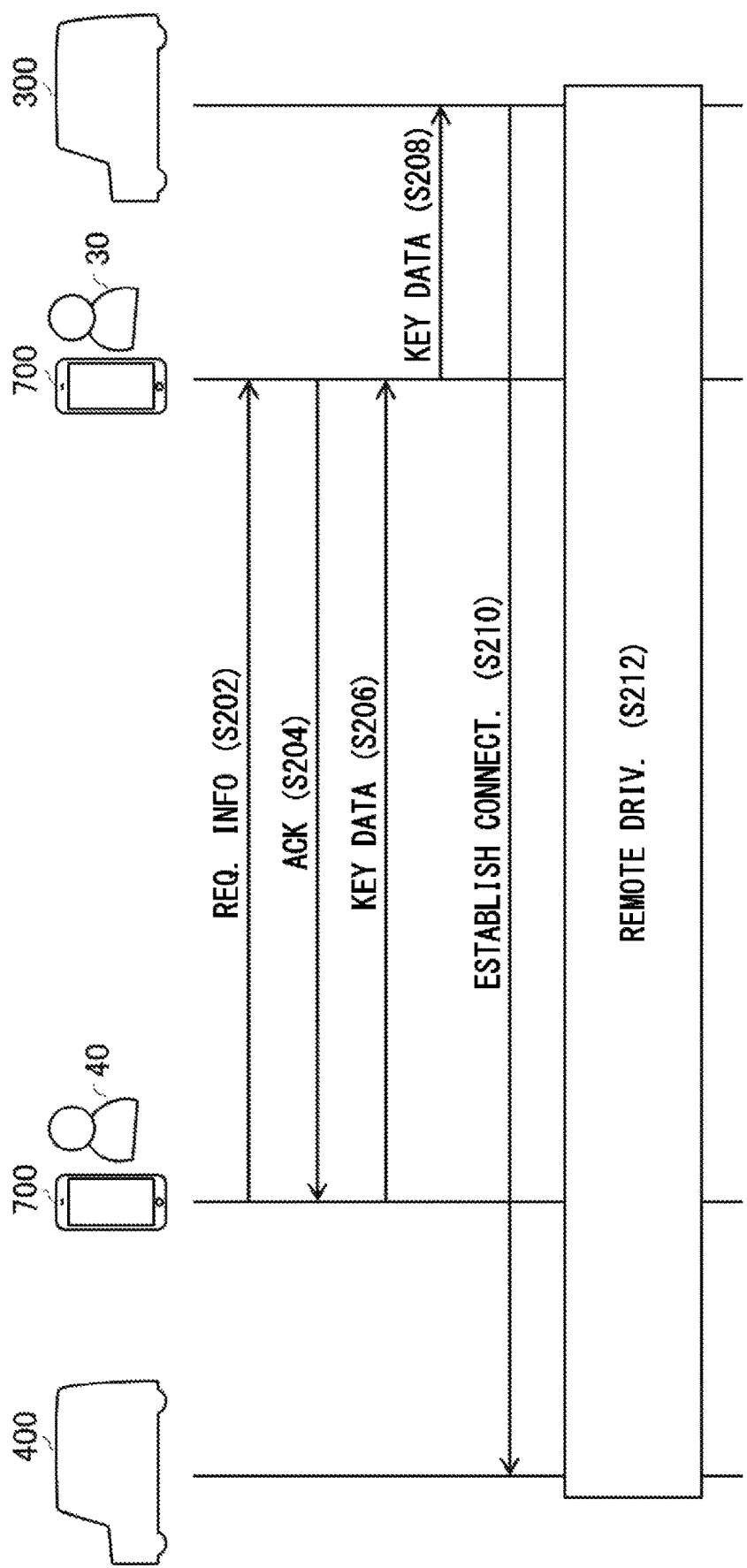
FIG. 10 schematically illustrates an exemplary flow of processes to be performed by communication terminals 700.

FIG. 10 schematically illustrates an exemplary flow of processes to be performed by communication terminals 700. In the flow of processes explained here, a communication terminal 700 generates key data. Differences from FIG. 2 are mainly explained.

At S202, a communication terminal 700 sends request information to a communication terminal 700 of a user 30 following an instruction by a user 40. At S204, the communication terminal 700 of the user 30 sends an acknowledgement to the communication terminal 700 of the user 40 following an instruction by the user 30. Upon reception of the acknowledgement, the communication terminal 700 generates key data. At S206, the communication terminal 700 of the user 40 sends the generated key data to the communication terminal 700 of the user 30.

At S208, the communication terminal 700 of the user 30 sends the key data to a remote driving vehicle 300. At S212, the remote driving vehicle 300 uses the key data received at S208 to establish a connection with a vehicle 400. At S212, the remote driving vehicle 300 remotely drives the vehicle 400 through the connection established at S210.

Figure 11:
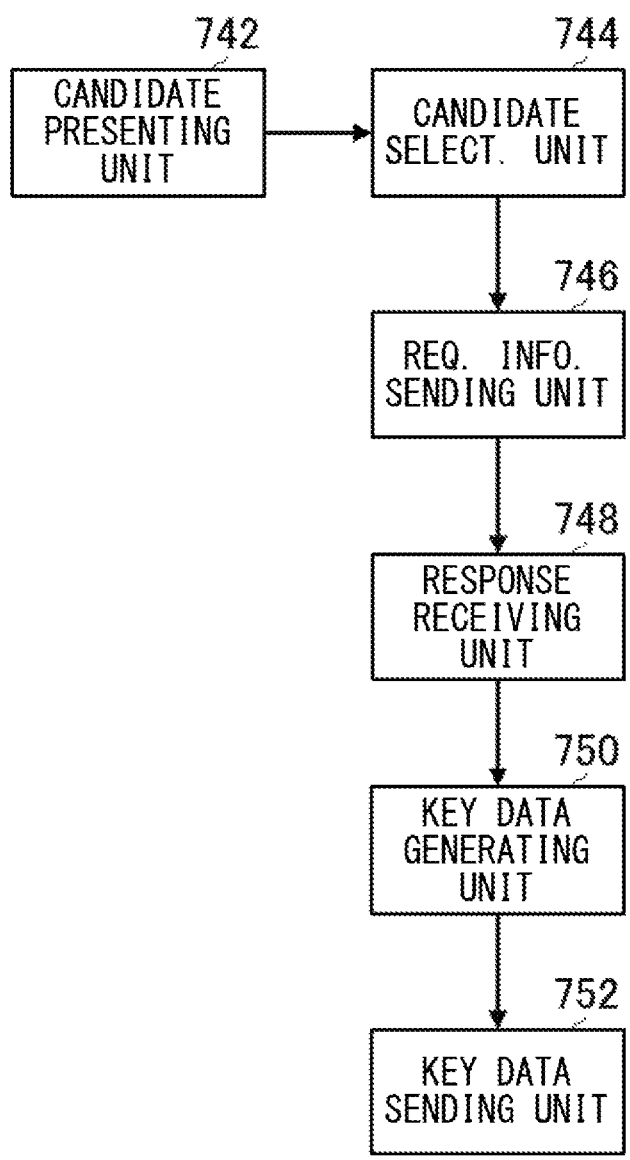
FIG. 11 schematically illustrates another exemplary functional configuration of a communication terminal 700.

FIG. 11 schematically illustrates another exemplary functional configuration of a communication terminal 700. FIG. 11 illustrates an exemplary functional configuration of the communication terminal 700 of a user 40 in the case that the communication terminal 700 of the user 40 requests a communication terminal 700 of a remote driving apparatus user for remote driving, by bypassing the remote driving managing apparatus 100. The communication terminal 700 includes a candidate presenting unit 742, a candidate selecting unit 744, a request information sending unit 746, a response receiving unit 748, a key data generating unit 750, and a key data sending unit 752.

The candidate presenting unit 742 presents candidates of a remote driving apparatus user who is to remotely drive a vehicle 400. The candidate presenting unit 742 causes a display unit provided to the vehicle 400 to display-output candidates, for example. In addition, the candidate presenting unit 742 may cause an audio output unit provided to the vehicle 400 to audio-output candidates. The candidate presenting unit 742 presents, as candidates, a plurality of remote driving apparatus users pre-registered in the communication terminal 700 of the user 40, for example.

The candidate selecting unit 744 selects a remote driving apparatus user who is to be requested to remotely drive the vehicle 400 from candidates presented by the candidate presenting unit 742. The candidate selecting unit 744 may select a remote driving apparatus user by receiving an indication of selection made by the user 40. The candidate selecting unit 744 may receive an indication of selection made by the user 40 through touch input to a display unit of the vehicle 400, audio input to an audio input unit of the vehicle 400, or the like, for example.

The request information sending unit 746 sends request information indicating a request for remote driving of the vehicle 400 to a communication terminal 700 of the remote driving apparatus user selected by the candidate selecting unit 744. The request information sending unit 746 may send the request information to the communication terminal 700 following an instruction by the user 40.

The response receiving unit 748 receives a response to the request information sent by the request information sending unit 746. The response receiving unit 748 receives an acknowledgement or a negative acknowledgement.

Upon reception of an acknowledgement by the response receiving unit 748, the key data generating unit 750 generates key data. The key data generating unit 750 may generate key data for enabling the remote driving apparatus to remotely drive the vehicle 400 based on identification information about the vehicle 400. The key data generating unit 750 generates key data that is valid only once, for example. The key data sending unit 752 sends, to the communication terminal 700 of the remote driving apparatus user, the key data generated by the key data generating unit 750.

Figure 12:
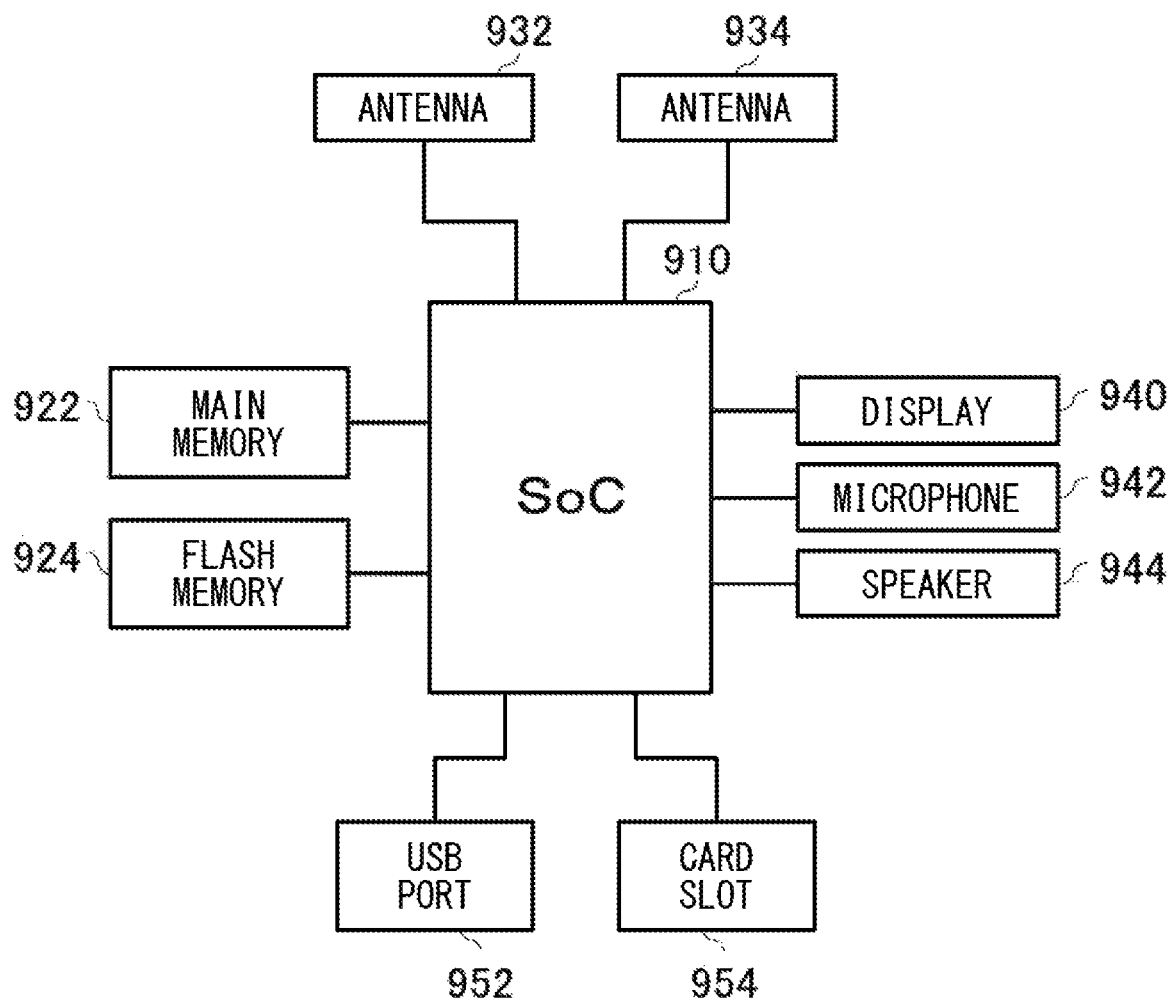
FIG. 12 schematically illustrates an exemplary hardware configuration of a computer 900 to function as a communication terminal 700.

FIG. 12 illustrates an exemplary hardware configuration of a computer 900 to function as a communication terminal 700. The computer 900 according to the present embodiment includes an SoC 910, a main memory 922, a flash memory 924, an antenna 932, an antenna 934, a display 940, a microphone 942, a speaker 944, a USB port 952, and a card slot 954.

The SoC 910 performs operation based on programs stored in the main memory 922, and flash memory 924, and performs control of each unit. The antenna 932 is a so-called cellular antenna. The antenna 934 is a so-called WiFi (registered trademark) antenna. The SoC 910 may use the antenna 932 and antenna 934 to realize various types of communication functions. The SoC 910 may use the antenna 932 or antenna 934 to receive programs to be used by the SoC 910, and store the programs in the flash memory 924, for example.

The SoC 910 may use the display 940 to realize various types of display functions. The SoC 910 may use the microphone 942 to realize various types of audio input function. The SoC 910 may use the speaker 944 to realize various types of audio output function.

The USB port 952 realizes USB connection. The card slot 954 realizes connection with various types of cards such as an SD card. The SoC 910 may receive the programs to be used by the SoC 910 from equipment or a memory connected to the USB port 952, and from a card connected to the card slot 954, and store the programs in the flash memory 924.

The programs that are installed in the computer 900, and make the computer 900 function as the communication terminal 700 may act on the SoC 910 or the like, and may each make the computer 900 function as a unit(s) of the communication terminal 700. Information processing described in these programs are read in by the computer 900 to thereby function as the candidate presenting unit 712, user information receiving unit 714, attribute information sending unit 716, vehicle information sending unit 718, candidate selecting unit 720, request information sending unit 722, response receiving unit 724, and generation requesting unit 726, which are specific means attained by cooperation between software and various types of hardware resources mentioned above. In addition, information processing described in these programs are read in by the computer 900 to thereby function as the candidate presenting unit 742, candidate selecting unit 744, request information sending unit 746, response receiving unit 748, and key data sending unit 752, which are specific means attained by cooperation between software and various types of hardware resources mentioned above. Then, with these specific means, operations on or processing of information corresponding to an intended use of the computer 900 in the present embodiment are realized to thereby construct the unique communication terminal 700 corresponding to the intended use.

Figure 13:
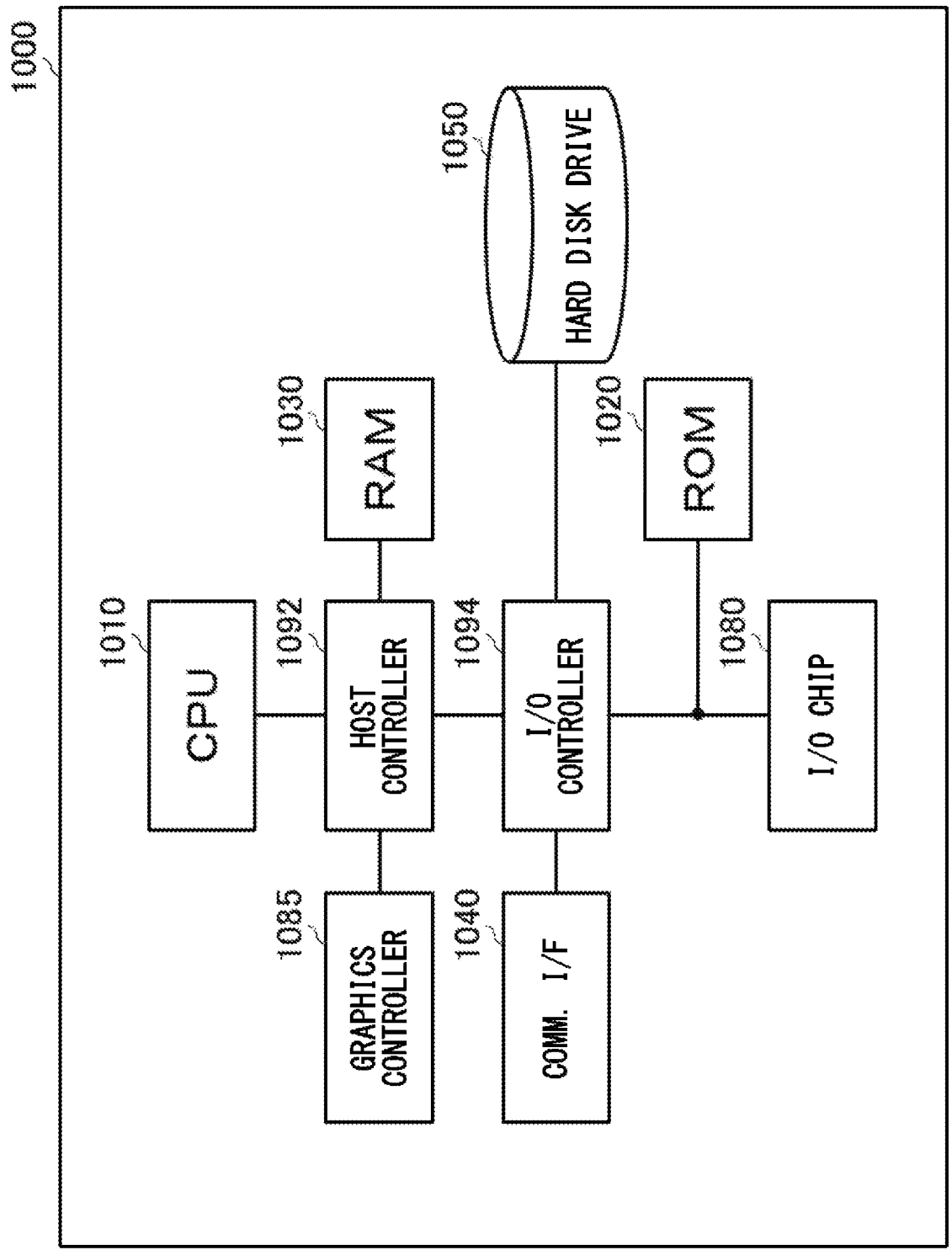
FIG. 13 schematically illustrates an exemplary hardware configuration of a computer 1000 to function as the remote driving managing apparatus 100.

FIG. 13 schematically illustrates an exemplary hardware configuration of a computer 1000 to function as the remote driving managing apparatus 100. The computer 1000 according to the present embodiment includes: a CPU peripheral unit having a CPU 1010, a RAM 1030, and a graphics controller 1085 that are interconnected by a host controller 1092; and an input/output unit having a ROM 1020, a communication I/F 1040, a hard disk drive 1050, and an input/output chip 1080 that are connected to the host controller 1092 by an input/output controller 1094.

The CPU 1010 performs operations based on programs stored in the ROM 1020 and RAM 1030, and performs control of each unit. The graphics controller 1085 acquires image data generated by the CPU 1010 or the like on a frame buffer provided in the RAM 1030, and makes a display display the image data. Instead of this, the graphics controller 1085 may include therein a frame buffer to store image data generated by the CPU 1010 or the like.

The communication I/F 1040 communicates with another device via a network through a wired or wireless connection. In addition, the communication I/F 1040 functions as hardware to perform communication. The hard disk drive 1050 stores programs and data to be used by the CPU 1010.

The ROM 1020 stores a boot-program to be executed by the computer 1000 at the time of activation, and programs or the like that depend on hardware of the computer 1000. The input/output chip 1080 connects various types of input/output devices to the input/output controller 1094 through, for example, a parallel port, a serial port, a keyboard port, a mouse port, and the like.

Programs to be provided to the hard disk drive 1050 through the RAM 1030 are provided by a user in the form stored in a recording medium such as an IC card. The programs are read out from the recording medium, installed in the hard disk drive 1050 through the RAM 1030, and executed at the CPU 1010.

The programs that are installed in the computer 1000, and make the computer 1000 function as the remote driving managing apparatus 100 may act on the CPU 1010 or the like, and may each make the computer 1000 function as a unit(s) of the remote driving managing apparatus 100. Information processing described in these programs are read in by the computer 1000 to thereby function as the storage unit 102, driving history acquiring unit 104, history analyzing unit 106, vehicle information collecting unit 110, information receiving unit 120, information acquiring unit 122, user information sending unit 124, request accepting unit 130, key data generating unit 132, and key data sending unit 134, which are specific means attained by cooperation between software and various types of hardware resources mentioned above. Then, with these specific means, operations on or processing of information corresponding to an intended use of the computer 1000 in the present embodiment are realized to thereby construct the unique remote driving managing apparatus 100 corresponding to the intended use.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: remote driving system; 20: user; 30: user; 40: user; 80: network; 100: remote driving managing apparatus; 102: storage unit; 104: driving history acquiring unit; 106: history analyzing unit; 110: vehicle information collecting unit; 120: information receiving unit; 122: information acquiring unit; 124: user information sending unit; 130: request accepting unit; 132: key data generating unit; 134: key data sending unit; 200: remote driving facility; 214: wheel; 216: pedal; 218: display unit; 220: control unit; 222: key data acquiring unit; 224: connection establishing unit; 226: control signal sending unit; 230: key data reading unit; 240: wireless communication unit; 250: display control unit; 260: contents-of-manipulation acquiring unit; 300: remote driving vehicle; 310: control unit; 312: key data acquiring unit; 314: connection establishing unit; 316: control signal sending unit; 320: contents-of-manipulation acquiring unit; 330: key data reading unit; 340: wireless communication unit; 350: display control unit; 400: vehicle; 402: contents-of-manipulation acquiring unit; 412: image-capturing unit; 414: radar apparatus; 416: LIDAR; 418: object recognizing unit; 420: image acquiring unit; 430: wireless communication unit; 440: vehicle control unit; 700: communication terminal; 712: candidate presenting unit; 714: user information receiving unit; 716: attribute information sending unit; 718: vehicle information sending unit; 720: candidate selecting unit; 722: request information sending unit; 724: response receiving unit; 726: generation requesting unit; 742: candidate presenting unit; 744: candidate selecting unit; 746: request information sending unit; 748: response receiving unit; 750: key data generating unit; 752: key data sending unit; 1000: computer; 1010: CPU; 1020: ROM; 1030: RAM; 1040: communication I/F; 1050: hard disk drive; 1080: input/output chip; 1085: graphics controller; 1092: host controller; 1094: input/output controller

What is claimed is:

1. A communication terminal comprising:
   a candidate presenting unit that presents candidates of a remote driving apparatus user who is to remotely drive a vehicle;
   a request information sending unit that sends, to a communication terminal of the remote driving apparatus user selected from the candidates, request information indicating a request for remote driving of the vehicle;
   a response receiving unit that receives, from the communication terminal of the remote driving apparatus user, an acknowledgement of the request information; and
   a generation requesting unit that: sends first user identification information identifying a user of the vehicle, and second user identification information identifying the remote driving apparatus user to a server; and requests the server to generate key data for enabling a remote driving apparatus corresponding to the second user identification information to remotely drive the vehicle corresponding to the first user identification information.

2. The communication terminal according to claim 1, comprising:
   an attribute information sending unit that sends attribute information about the user of the vehicle to the server; and
   a user information receiving unit that receives, from the server, information about remote driving apparatus users having attribute information corresponding to the attribute information about the user of the vehicle, wherein
   the candidate presenting unit presents the candidates based on information about the remote driving apparatus users received by the user information receiving unit.

3. The communication terminal according to claim 2, wherein
   the attribute information sending unit sends a driving style of the user of the vehicle to the server, and
   the user information receiving unit receives, from the server, information about remote driving apparatus users including driving styles matching the driving style of the user of the vehicle.

4. The communication terminal according to claim 3, wherein the driving style of the user of the vehicle indicates at least any one of a driving speed tendency, a tendency among the numbers of times of acceleration/deceleration, a bypath usage tendency, and a side-trip tendency of the user of the vehicle.

5. The communication terminal according to claim 2, wherein
   the attribute information sending unit sends a driving history of the user of the vehicle to the server, and
   the user information receiving unit receives user information about remote driving apparatus users identified based on the driving history of the user of the vehicle, and driving histories of the remote driving apparatus users.

6. The communication terminal according to claim 5, wherein the driving history of the user of the vehicle includes at least any one of: a history of areas through which the user has travelled by driving a vehicle; a history of time periods during which the user has travelled by driving a vehicle; and a history of destinations to which the user has moved by driving a vehicle.

7. The communication terminal according to claim 2, wherein
   the attribute information sending unit sends, to the server, basic information about the user of the vehicle including at least any one of an age and a gender of the user, and
   the user information receiving unit receives, from the server, information about remote driving apparatus users including basic information matching the basic information about the user of the vehicle.

8. The communication terminal according to claim 1, comprising:
   a vehicle information sending unit that sends, to the server, vehicle information which is information about the vehicle; and
   a user information receiving unit that receives, from the server, information about remote driving apparatus users corresponding to the vehicle information, wherein
   the candidate presenting unit presents the candidates based on the information about the remote driving apparatus users received by the user information receiving unit.

9. The communication terminal according to claim 8, wherein
   the vehicle information sending unit sends a vehicle name of the vehicle to the server, and the user information receiving unit receives user information about remote driving apparatus users including vehicle names corresponding to the vehicle name of the vehicle.

10. The communication terminal according to claim 9, wherein
the vehicle information sending unit sends the vehicle name and a specification of the vehicle to the server, and
the user information receiving unit receives user information about remote driving apparatus users including vehicle names and specifications corresponding to the vehicle name and the specification of the vehicle.

11. The communication terminal according to claim 8, wherein
the vehicle information sending unit sends a vehicle body shape of the vehicle to the server, and
the user information receiving unit receives user information about remote driving apparatus users including vehicle body shapes corresponding to the vehicle body shape of the vehicle.

12. The communication terminal according to claim 8, wherein
the vehicle information sending unit sends a vehicle model of the vehicle to the server, and
the user information receiving unit receives user information about remote driving apparatus users including vehicle models corresponding to the vehicle model of the vehicle.

13. The communication terminal according to claim 8, wherein
the vehicle information sending unit sends, to the server, equipment information indicating equipment of the vehicle, and
the user information receiving unit receives user information about remote driving apparatus users including equipment corresponding to the equipment indicated by the equipment information about the vehicle.

14. The communication terminal according to claim 13, wherein
the vehicle information sending unit sends, to the server, a vehicle name of the vehicle and equipment information indicating equipment of the vehicle, and
the user information receiving unit receives user information about remote driving apparatus users including vehicle names corresponding to the vehicle name of the vehicle and equipment corresponding to the equipment indicated by the equipment information about the vehicle.

15. A non-transitory computer-readable storage medium having stored thereon a program for causing a computer to function as:
a candidate presenting unit that presents candidates of a remote driving apparatus user who is to remotely drive a vehicle;
a request information sending unit that sends, to a communication terminal of the remote driving apparatus user selected from the candidates, request information indicating a request for remote driving of the vehicle;
a response receiving unit that receives, from the communication terminal of the remote driving apparatus user, an acknowledgement of the request information; and
a generation requesting unit that: sends first user identification information identifying a user of the vehicle, and second user identification information identifying the remote driving apparatus user to a server; and requests the server to generate key data for enabling a remote driving apparatus corresponding to the second user identification information to remotely drive the vehicle corresponding to the first user identification information.

16. A communication terminal comprising:
a candidate presenting unit that presents candidates of a remote driving apparatus user who is to remotely drive a vehicle;
a request information sending unit that sends, to a communication terminal of the remote driving apparatus user selected from the candidates, request information indicating a request for remote driving of the vehicle;
a response receiving unit that receives, from the communication terminal of the remote driving apparatus user, an acknowledgement of the request information; and
a key data generating unit that generates key data for enabling a remote driving apparatus of the remote driving apparatus user to remotely drive the vehicle; and
a key data sending unit that sends the key data to the communication terminal of the remote driving apparatus user.

17. The communication terminal according to claim 16, wherein the key data generating unit generates the key data that is valid only once.

18. The communication terminal according to claim 1, wherein the generation requesting unit requests the server to generate the key data that is valid only once.

19. The non-transitory computer-readable storage medium according to claim 15, wherein the generation requesting unit requests the server to generate the key data that is valid only once.

* * * * *